US007633503B2

(12) United States Patent
Snyder et al.

(10) Patent No.: US 7,633,503 B2
(45) Date of Patent: Dec. 15, 2009

(54) LOCAL, DEFORMABLE PRECOMPUTED RADIANCE TRANSFER

(75) Inventors: John M. Snyder, Redmond, WA (US);
Ben F. Luna, Ballard, WA (US);
Peter-Pike J. Sloan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 215 days.

(21) Appl. No.: 11/089,265

(22) Filed: Mar. 22, 2005

(65) Prior Publication Data

US 2006/0214931 A1 Sep. 28, 2006

(51) Int. Cl.
*G06T 15/50* (2006.01)
(52) U.S. Cl. .................. 345/426; 345/419; 382/118; 382/154; 382/190; 382/224
(58) Field of Classification Search ................ 345/426, 345/419; 382/154
See application file for complete search history.

(56) References Cited

U.S. PATENT DOCUMENTS 6,853,745 B1 * 2/2005 Jacobs et al. ................ 382/154

OTHER PUBLICATIONS

Peter-Pike Sloan, Jan Kautz, John Snyder, "Precomputed Radiance Transfer for Real-Time Rendering in Dynamic, Low-Frequency Lighting Environments", International Conference on Computer Graphics and Interactive Techniques, Proceedings of the 29th annual conference on Computer graphics and interactive techniques, pp. 527-536, Year of Pub: 2002.*
E.T. Whittaker & G.N. Watson, "A Course of Modern Analysis", Jun. 18, 1927, Cambridge University Press, 4th Edition.*
Calvert, "Spherical Harmonics," http://mysite.du.edu/~jcalvert/math/harmonic/harmonic.htm, 5 pages, printed from Internet on Jan. 16, 2008, last revised Mar. 12, 2001.
Weinstein, "Spherical Harmonic," Wolfram Research, http://mathworld.wolfram.com/SphericalHarmonic.html, 6 pages, printed from Internet on Jan. 18, 2008, last updated on Jan. 12, 2008.
Weinstein, "Zonal Harmonic," Wolfram Research, http://mathworld.wolfram.com/ZonalHarmonic.html, 2 pages, printed from Internet on Jan. 16, 2008, last updated Jan. 12, 2008.

(Continued)

*Primary Examiner*—Kimbinh T Nguyen
(74) *Attorney, Agent, or Firm*—Klarquist Sparkman, LLP

(57) ABSTRACT

Computer graphics image rendering techniques render images using a precomputed radiance transfer (PRT) to model local effects such as bumps, wrinkles, or other detailed features on an arbitrarily deformable model's surface. The techniques apply zonal harmonics (ZH) which approximate spherical functions as sums of circularly symmetric functions around different axes. By spatially varying both the axes and coefficients of these basis functions, approximations can fit to spatially varying transfer signals. Compared to the spherical harmonic (SH) basis, the ZH basis yields a more compact approximation, and can be rotated at a low computational expense suitable for dense per-vertex or per-pixel evaluation. This allows PRT to be mapped onto deforming models which re-orient the local coordinate frame.

18 Claims, 10 Drawing Sheets

(7 of 10 Drawing Sheet(s) Filed in Color)

OTHER PUBLICATIONS

Ashikhmin, "Steerable Illumination Textures", *ACM Transactions on Graphics*, vol. 21, No. 1, pp. 1-19 (Jan. 2002).

Choi et al., "Rapid and Stable Determination of Rotation Matrices Between Spherical Harmonics by Direct Recursion", *The Journal of Chemical Physics*, vol. 111, No. 19, pp. 8825-8831 (Nov. 1999).

Cook et al., "A Reflectance Model for Computer Graphics", *ACM Transaction on Graphics*, vol. 1, No. 1, pp. 7-24 (Jan. 1982).

Heidrich et al., "Illuminating Micro Geometry Based on Precomputed Visibility", *SIGGRAPH 2000*, pp. 455-464 (2000).

James et al., "Precomputing Interactive Dynamic Deformable Scenes", *SIGGRAPH 2003*, pp. pp. 879-887 (2003).

Kautz et al., "Fast, Arbitrary BRDF Shading for Low-Frequency Lighting Using Spherical Harmonics", *Eurographics Workshop on Rendering*, pp. 291-296 (2002).

Kautz et al., "Hemispherical Rasterization for Self-Shadowing of Dynamic Objects", *Proceedings of Eurographics Symposium on Rendering*, pp. 179-184 (2004).

Liu et al., "All-Frequency Precomputed Radiance Transfer for Glossy Objects", *Proceedings of Eurographics Symposium on Rendering* (2004).

Malzbender, "Polynomial Texture Maps", *SIGGRAPH*, pp. 519-528 (2001).

McCallister et al., "Efficient Rendering of Spatial Bi-directional Reflectance Distribution Functions", *Graphics Hardware*, pp. 171-178 (2002).

Miller, "Efficient Algorithms for Local and Global Accessibility Shading", *SIGGRAPH*, pp. 319-326 (1994).

Müller, "Fast Environmental Lighting for Local-PCA Encoded BTF's", *Computer Graphics International*, pp. 198-205 (2004).

Ng et al., "All-Frequency Shadows Using Non-linear Wavelet Lighting Approximation" *SIGGRAPH*, pp. 376-381 (2003).

Ramamoorthi et al., "An Efficient Representation for Irradiance Environment Maps", *SIGGRAPH*, pp. 497-500 (2001).

Sloan et al., "Precomputed Radiance Transfer for Real-Time Rendering in Dynamic, Low-Frequency Lighting Environments", *SIGGRAPH*, pp. 527-536 (2003).

Sloan et al., "Clustered Principal Components for Precomputed Radiance Transfer", *SIGGRAPH*, pp. 382-391 (2003).

Sloan et al., "Bi-Scale Radiance Transfer", *SIGGRAPH*, pp. 370-375 (2003).

Wang et al., "All-Frequency Relighting of Non-Diffuse Objects Using Separable BRDF Approximation", *Eurographics Symposium on Rendering* (2004).

Westin et al., "Predicting Reflectance Functions from Complex Surfaces", *SIGGRAPH*, pp. 255-272 (1992).

Mathworld, "Spherical Harmonic", pp. 1-11, *Downloaded from the Internet*, Feb. 17, 2005.

* cited by examiner

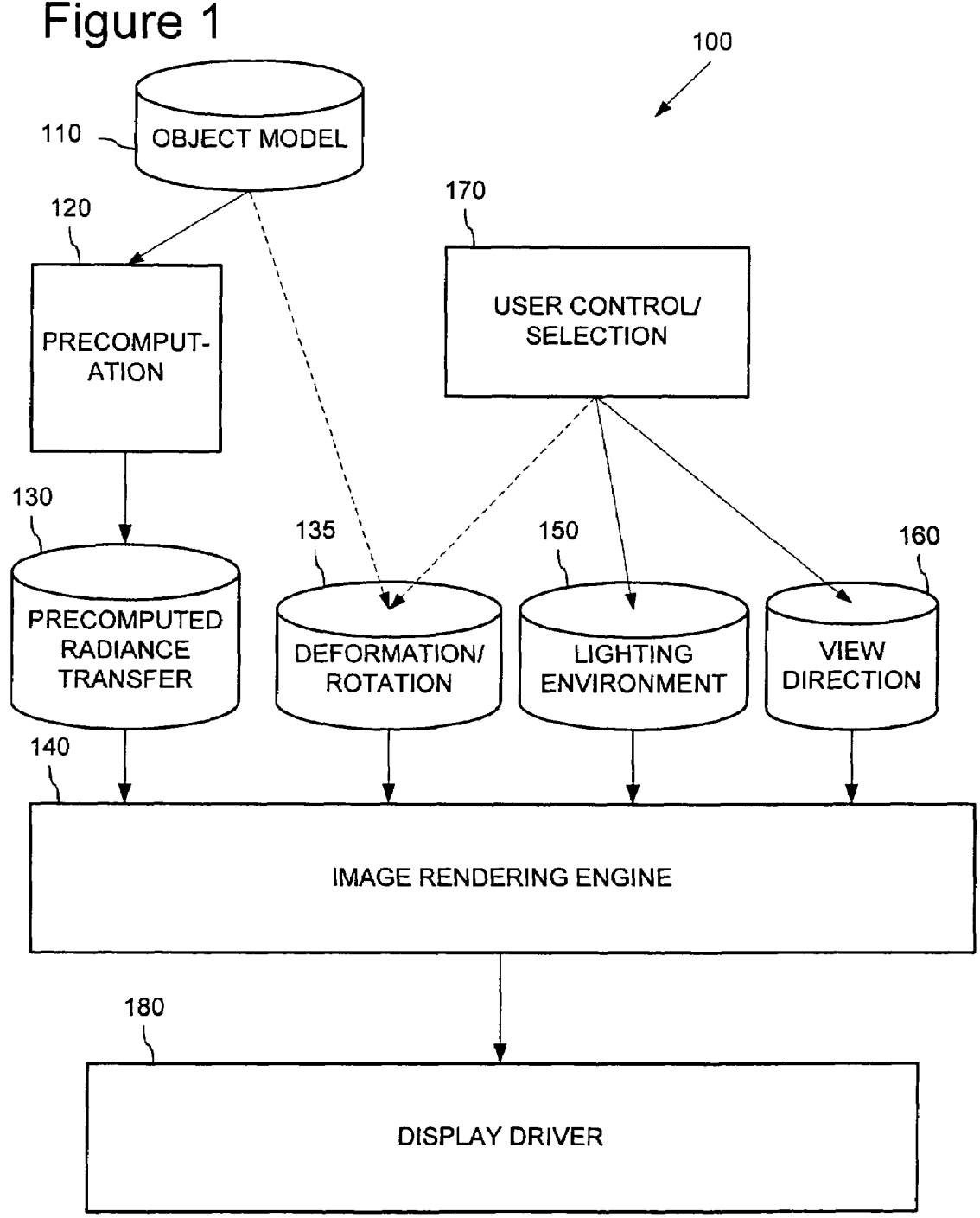

Figure 13A
Figure 13B
Figure 13C
Figure 14A
Figure 14B
Figure 14C
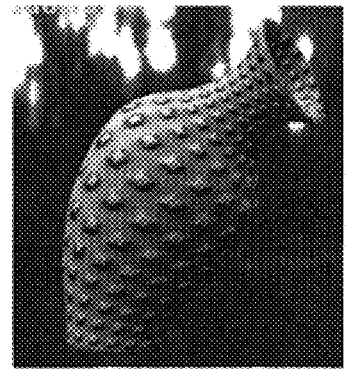
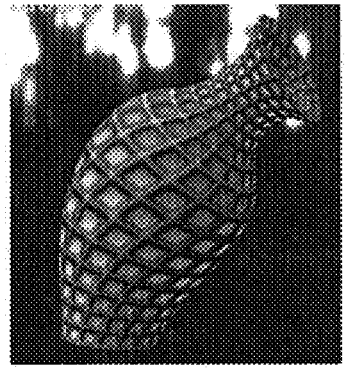
Figure 14D
Figure 14E
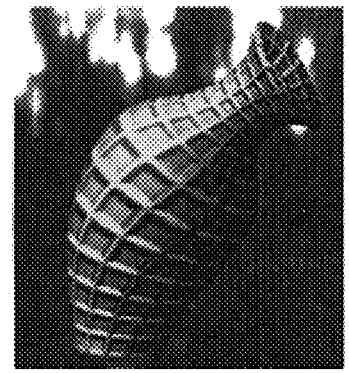

Software 1580 Implementing Local, Deformable Precomputed Radiance Transfer Image Rendering

LOCAL, DEFORMABLE PRECOMPUTED RADIANCE TRANSFER

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

The present invention relates to computer graphics image rendering techniques, and more particularly relates to lighting and shadowing of a modeled object in the rendered image.

BACKGROUND

Real-time lighting effects like soft shadows and subsurface scattering can be obtained with graphics rendering techniques that involve precomputed radiance transfer (PRT). Images generated using these techniques exhibit a compelling realism lacking from traditional computer graphics with its emphasis on hard shadows and opaque surfaces. However, PRT techniques have been limited to static objects or highly constrained, precomputed sequences.

PRT methods for static objects can be categorized as low-frequency (such as described by Sloan, P., Kautz, J., and Snyder, J., "Precomputed Radiance Transfer For Real-Time Rendering In Dynamic, Low-Frequency Lighting Environments," *Proc. of SIGGRAPH* '02, 527-536; and Sloan, P., Hall, J., Hart, J., and Snyder, J., "Clustered Principal Components For Precomputed Radiance Transfer," *Proc. of SIGGRAPH* '03, 382-391) and all-frequency (such as described by Ng, R., Ramamoorthi, R., and Hanrahan, P., "All-Frequency Shadows Using Non-Linear Wavelet Lighting Approximation," *Proc. of SIGGRAPH* '03, 376-381; Liu, X., Sloan, P., Shum, H., and Snyder, J., "All-Frequency Precomputed Radiance Transfer For Glossy Objects," *Proc. of 2004 Eurographics Symposium on Rendering*; and Wang, R., Tran, J., and Luebke, D., "All-Frequency Relighting Of Non-Diffuse Objects Using Separable BRDF Approximation," *Proc. of 2004 Eurographics Symposium on Rendering*), according to the lighting and shading frequencies handled. Though more general, all-frequency PRT is problematic because it tabulates much more data per point to represent transfer from higher-dimensional lighting vectors, and many more points per object to represent higher frequency shading variation over that object. The resulting data sets are enormous, and remain unwieldy even after sophisticated compression techniques are applied.

PRT has also been applied to deformable models (described by James, D., And Fatahalian, K., "Precomputing Interactive Dynamic Deformable Scenes," *Proc. of SIGGRAPH* '03, 879-887) but the preprocessing was essentially done for each pose of the object in a low-dimensional control space: the space of elastic deformations caused by an impulse at an arbitrary instant (i.e., a "poke"). Models can only be poked, they can't be bent or twisted, walk, or flap their wings. This did not permit capturing local effects for models where the deformations are not known in advance, and so can have arbitrarily many degrees of freedom.

Bi-scale radiance transfer (described by Sloan, P., Liu, X., Shum, H., And Snyder, J., "Bi-Scale Radiance Transfer," *Proc. of SIGGRAPH* '03, 370-375) and environmental lighting with BTFs (described by Muller, G., Meseth, J., And Klein, R., "Fast Environmental Lighting For Local-PCA Encoded BTFs," *Proc. of Computer Graphics International*, 198-205) capture both local and distant transfer effects on static objects. The distant level, represented as transfer matrices, is required not only to obtain distant effects but also to rotate the lighting vector to the local frame. If the object deforms, this rotation is impractical to tabulate and so must be performed dynamically at each surface point. These methods also capture view dependent parallax effects using 4D textures.

SUMMARY

Image rendering techniques described herein model radiance transfer over a deformable surface, using a technique referred to herein as Local, Deformable Precomputed Radiance Transfer (LDPRT). This technique focuses on extending PRT to dynamic, arbitrarily deformable objects.

One implementation of the LDPRT technique described herein is restricted to local PRT: how to encapsulate the realistic shading effects mentioned above but from detailed surface features, such as wrinkles and bumps commonly represented as texture maps, where the feature's shading influence is spatially nearby. Distant effects, such as shadowing from one limb of an articulated figure onto its trunk or another limb, are difficult because the required PRT simulation depends on the figure's pose. When this pose is parameterized by more than one or two degrees of freedom, both the preprocessing and run-time costs become overwhelming on current hardware.

Even for local PRT, previous methods are inadequate. To understand the difficulty involved, consider a diffuse object, whose self-transfer at some point can be represented as a transfer vector which is dotted with the light vector to produce the diffuse shade at that point. In previous work, transfer and lighting vectors were represented using spherical harmonics (SH), a compact basis for low-frequency lighting. If the object is static, previous techniques simply record a PRT vector at each point as a preprocess, assuming the lighting is in a global coordinate frame. If the object rotates rigidly, we can rotate the lighting vector from the rotated into the original (rest) orientation of the object, once for all its points, before computing the per-point shading dot product. But if the object deforms nonrigidly, we must rotate the lighting to the rest frame, on-the-fly at every surface point. SH rotation is costly and unsuited for real-time evaluation on graphics hardware over dense point sets.

The described LDPRT technique solves this problem by rotating transfer to the deformed frame instead of rotating lighting to the rest frame. The technique approximates transfer with zonal harmonics (ZH), which represents spherical functions as a sum of lobes or circularly symmetric functions (as described by, e.g., Whittaker, E., And Watson, G., "*A Course in Modern Analysis, 4th Ed.*," Cambridge University Press, Cambridge, England). The ZH representation allows on-the-fly rotation, simply by rotating each lobe's axis, and is easily evaluated per-pixel and in real-time on graphics hardware. With a simple implementation, shading speed is comparable to previous methods using the SH basis, but can be significantly accelerated by a precomputation over the lighting environment.

The LDPRT technique described herein contributes a new representation for local, low frequency, quickly-rotatable radiance transfer. LDPRT has two advantages over previous methods. It allows local PRT effects to be mapped onto any static or deforming surface. And it performs the precomputation over a single mesh or texture patch, not over every pose of a deforming model. The LDPRT technique applies sums of zonal harmonics with spatially varying directions and coefficients to allow fast transfer rotation and shading. This model generalizes previous convolution and "bent normal" methods, providing controllably low approximation error when fit to PRT signals from arbitrary local geometry. Results achieved with the LDPRT technique that are described herein show realistic effects such as soft shadows, inter-reflections, and subsurface scattering from textural features, mapped onto dynamic models and synthesized in real-time on graphics hardware.

Additional features and advantages of the invention will be made apparent from the following detailed description of embodiments that proceeds with reference to the accompanying drawings.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 1 is a block diagram of a software architecture of a computer graphics rendering system incorporating local, deformable precomputed radiance transfer for image rendering.

FIGS. 13A-C are color photographic images of an exemplary deformed 3d modeled object (Mayan face), comparing results achieved (A) ray-traced; (B) undeformed shading; and (C) with LDPRT.

FIGS. 14A-E are color photographic images of an exemplary deformed 3d modeled object (vase) with various LDPRT textures mapped thereon, including (A) bumps, 64×64; (B) weave, 32×32; and (C) waffle (subsurface, 64×64; (D) waffle (glossy), 128×128; and (E) swirl, 128×128.

DETAILED DESCRIPTION

Figure 2A:
FIGS. 2A-B are color photographic images of a computer-generated "bat" model demonstrating shading effects achieved using a local, deformable precomputed radiance transfer technique.

1. Computer Graphics Image Rendering System Overview

With reference to FIG. 1, a software architecture of a computer graphics image rendering system 100 provides image rendering of a modeled object with a local, deformable precomputed radiance transfer (LDPRT) image rendering technique described herein. In general, the software architecture includes a radiance transfer precomputation 120, an image rendering engine 140, and a graphics display driver 180. In the local, deformable precomputed radiance transfer rendering technique described more fully below, the precomputation 120 performs a pre-processing stage of the technique, which precomputes radiance self-transfer (PRT) data 130 from a geometric object model 110. The geometric model 110 can be a triangulated mesh, wavelet composition, or any other representation of the geometry of the object being modeled, as well as a height field or other model of the meso-scale structure of the object. The image rendering engine 140 then uses the PRT data 130 to render images of the deformable modeled object for a deformation 135, a dynamically variable lighting environment 150 and a viewing direction 160, which can be selectively varied or set with user controls 170 or alternatively by programming. The graphics display driver 180 outputs the images to an image output device (e.g., to a monitor, projector, printer or like).

In some embodiments of the graphics image rendering system, the LDPRT precomputation of simulator 120 and image rendering by the engine 140 can be implemented on a single computer, such as that described in the section entitled, Computing Environment, below. More generally, the simulator 120 can be run on a separate computer, and the resulting data then transferred to the computer on which the rendering engine 140 runs to produce the graphics images.

2. Zonal Harmonics for Precomputed Radiance Transfer 2.1 Zonal Harmonics for Spherical Functions Spherical harmonics (SH) represent a scalar spherical function $$f(s), s = (s_x, s_y, s_z) \in S^2 \text{ via} \quad (1)$$

$$f(s) = \sum_{l=0}^{n-1} \sum_{m=-l}^{+l} f_{lm} y_{lm}(s) = f \cdot y(s)$$

where n is the order of the SH expansion, y(s) is the vector of SH basis functions, and $f$ is the vector of coefficients for $f(s)$. Both vectors have $n^2$ components. One property of the SH representation is that arbitrary rotations of $f(s)$ can be represented exactly using independent rotations of the coefficients $f_{lm}$ in each band, which is indexed by a constant value of l and has 2l+1 components.

A function g(s) which is circularly symmetric about the z axis can be represented more simply as $$g(s) = g(s_z) = \sum_{l=0}^{n-1} g_l y_{l0}(s_z) \qquad (2)$$

where $s_z$ is the z component of the spherical point s, and the basis functions $y_{l0}(s)$ are a subset of the SH basis functions (m=0) given by Legendre polynomials and dependent only on $s_z$. Such functions are also called zonal harmonics (ZH) because their zeroes form parallels (lines of constant latitude), which divide the sphere into zones. Note that $s_z$ is just the cosine of the angle between s and the z axis and is often written $\cos \theta$ when spherical functions are parameterized by the angular variables ($\theta$, $\phi$).

Spherical convolution of the functions $f$ and $g$ is then given by $$f * g(s) = \sum_{lm} y_{lm}(s) \left( \sqrt{\frac{4\pi}{2l+1}} g_l \right) f_{lm} = \sum_{lm} y_{lm}(s) g_l^* f_{lm} \qquad (3)$$

where $$g_l^* = \sqrt{\frac{4\pi}{2l+1}} g_l \qquad (4)$$

In matrix/vector notation, we write this as $f*g(s) = y\dagger(s) G^* f$ where $y(s)$ and $f$ are vectors of SH coefficients as before, $y\dagger$ is the transpose of $y$, and $G^*$ is a diagonal matrix composed of the convolution coefficients $g_l^*$ each repeated 2l+1 times in successive bands l=0, l=1, etc. For example, for n=3 the diagonal of $G^*$ is the 9D vector ($g_0^*$, $g_1^*$, $g_1^*$, $g_1^*$, $g_2^*$, $g_2^*$, $g_2^*$, $g_2^*$, $g_2^*$).

The convolution property allows us to rotate any circularly symmetric function and find its resulting SH coefficients. Define the function $\hat{g}(s) = g(R^{-1}s)$ where the rotation R maps the z axis to an arbitrary axis $s^*$. To find the coefficients of $\hat{g}$, we have $$\int_{S^2} f(s)\hat{g}(s)ds = f*g(s^*) = \sum_{lm} f_{lm} \hat{g}_{lm} \qquad (5)$$

where the last equality is true by the orthogonality of the SH basis. Since this is true for any function $f$, substituting the definition of $f*g$, we obtain $$\hat{g}_{lm} = y_{lm}(s^*) g_l^* \qquad (6)$$

yielding the rotated coefficients, where $g_l^*$ is defined in equation (4). This observation gives rise to the zonal harmonic representation, which represents $f(s)$ as the sum of N circularly symmetric lobes, indexed by i. A component of $f$ is approximated by $\tilde{f}$ via $$f_{lm} \approx \tilde{f}_{lm} = \sum_{i=1}^{N} y_{lm}(s_i^*) g_{il}^* \qquad (7)$$

We write this in matrix/vector notation as $$f \approx \tilde{f} = \sum_{i=1}^{N} y\dagger(s_i^*) G_i^* \qquad (8)$$

The continuous reconstruction of $f(s)$ is then approximated by $$f(s) \approx \tilde{f}(s) = \sum_{i=1}^{N} y\dagger(s_i^*) G_i^* y(s) \qquad (9)$$

Here, the $s_i^*$ are called the lobe axes and the set of n coefficients $g_i^*$ per lobe are called the lobe coefficients. When N=1, we call the ZH approximation single-lobe, and multi-lobe if N>1.

The advantage of this representation is its simplicity of spherical rotation. Define a rotated version of $f(s)$ via $\hat{f}(s) = f(R^{-1}s)$ where R is a 3D rotation matrix. Given the vector $f$ of SH coefficients, this rotation can be performed by applying a (2l+1)×(2l+1) rotation matrix in each band, an operation that is $O(n^3)$ in the SH order n and computationally very costly (see digression below). Using the ZH representation however, the operation is O(N) where typically N≦4 and trivial to evaluate:

$$\hat{f} \approx \sum_{i=1}^{N} y\dagger(Rs_i^*) G_i^* \qquad (10)$$

In other words, the rotated ZH representation rotates the lobe axes to $Rs_i^*$ while the lobe coefficients $g_i^*$ and thus the diagonal matrices $G_i^*$ remain unchanged (compare to equation (8)).

Each ZH lobe is axially symmetric. Negating the lobe direction and all its odd l lobe coefficients results in an identical function.

2.2 Applying Zonal Harmonics to Precomputed Radiance Transfer

Diffuse PRT Applying these ideas to PRT, assume that a low frequency lighting environment is represented in the SH basis as a vector e. For a diffuse surface, the transfer vector can be represented by another SH vector $t_p$ which varies over points on the surface p. The shading result is then given by $r_p = e \cdot t_p$, which is simply the spherical integral of source radiance e(s) times the object's transfer, $t_p(s)$, which encapsulates how the object shadows and scatters light onto itself at point p. For example, the transfer can be represented as an order 6 SH expansion, so that these vectors are 36D. For simplicity in the notation, the subscript p is dropped in the following discussion though transfer remains a spatially-varying quantity.

Now instead of recording transfer vectors in the SH basis, t, the system 100 records N lobe axes $s_i^*$, and for each axis its n coefficients $g_i^*$ which determine a diagonal matrix $G_i^*$. The transfer vector is approximated using equations (7,8) as $$t \approx \tilde{t} = \sum_{i=1}^{N} y\dagger(s_i^*)G_i^*, \qquad (11)$$

$$\tilde{t}_{lm} = \sum_{i=1}^{N} y_{lm}(s_i^*)g_{il}^*$$

A continuous spherical function $\tilde{t}(s)$ can be reconstructed from the vector $\tilde{t}$ via equation (9) as $$\tilde{t}(s) = \sum_{i=1}^{N} y\dagger(s_i^*)G_i^* y(s) \qquad (12)$$

and the shading result is then given by $r = \tilde{t} \cdot e$ or $$r = \sum_{i=1}^{N} y\dagger(s_i^*)G_i^* e = \sum_{i=1}^{N} \sum_{lm} y_{lm}(s_i^*)g_{il}^* e_{lm} \qquad (13)$$

The ZH transfer model therefore makes shading evaluation simple and, what's more, allows the transfer vector to be rotated easily to any frame using (10). Note that the N lobe axes and coefficients vary over the surface as did the original PRT vector t.

Figure 2B:

For example, this diffuse PRT technique can be used to shade the wings of a "bat" model that deforms to achieve a "flapping" motion in the computer-generated photographic images of FIGS. 2A-B. As the bat flaps its wings, LDPRT at any point on the bat can quickly be rotated from the rest coordinate frame where it is stored to the current, deformed orientation. In these example images, a single-lobe ZH model represents diffuse PRT including subsurface scatter. On currently available graphics hardware, these example images can be generated at real-time rendering rates (i.e., 240 Hz).

Glossy PRT For glossy objects, exit radiance is view-dependent rather than constant. The linearity of light transport means that exit radiance can be represented as a linear operator (matrix) on the source lighting vector e, given by $r(v) = y\dagger(v)Me$ where M is an $n^2 \times n^2$ transfer matrix and v is the view direction. M takes source lighting e in the SH basis and produces an exit radiance spherical function, also in the SH basis.

We can reduce the number of rows in M by specializing the output basis to the object's reflectance properties using a view/light factoring of its BRDF (such as described by Liu, X., Sloan, P., Shum, H., And Snyder, J., "All-Frequency Precomputed Radiance Transfer For Glossy Objects," *Proc. of 2004 Eurographics Symposium on Rendering*; and Wang, R., Tran, J., And Luebke, D., "All-Frequency Relighting Of Non-Diffuse Objects Using Separable BRDF Approximation," *Proc. of 2004 Eurographics Symposium on Rendering*). If b(v, s) is the BRDF, parameterized by view direction v and light direction s, the idea is to sample it over many view and light directions and perform a singular value decomposition (SVD) over the resulting matrix of samples. Using the SH basis for lighting, define a $n_v \times n^2$ matrix B where $n_v$ is the number of view samples, given by the following integral over the hemisphere $H = \{s | s_z \geq 0\}$:

$$B_{ij} = \int_H b(v_i, s) y_j(s) s_z \, ds = (U\Sigma V)_{ij} \approx (\tilde{U}\tilde{\Sigma}\tilde{V})_{ij} \qquad (14)$$

$U\Sigma V$ is the SVD of B. Selecting only the $n_b$ largest singular values yields the approximation $\tilde{U}\tilde{\Sigma}\tilde{V}$, where $\tilde{U}$ is $n_v \times n_b$, $\tilde{\Sigma}$ is a $n_b \times n_b$ diagonal matrix, and $\tilde{V}$ is $n_b \times n^2$.

Given B, glossy shading may be expressed as $r(v) = \gamma\backslash(v) BTe$ where T is the transfer matrix going from source to transferred incident radiance, as described by Kautz, J., Sloan, P., And Snyder, J., "Fast, Arbitrary BRDF Shading For Low-Frequency Lighting Using Spherical Harmonics," *Eurographics Workshop on Rendering*, 291-296. $\gamma(v)$ is an nv-dimensional vector that simply interpolates the correct components of exit radiance for a specified view direction v, and depends on the view parameterization. Using the SVD, shading is approximated by $$r(v) \approx (y\backslash(v)\tilde{U})(\tilde{\Sigma}\tilde{V}T)e = u(v)M'e \qquad (15)$$

M' is a $n_b \times n^2$ BRDF-specialized transfer matrix and $u(v) = (y\backslash(v)\tilde{U})$ is an $n_b$-dimensional view factor vector generated by the SVD. The approximation reduces the number of rows in the transfer matrix from $n^2(M)$ to $n_b(M')$.

Now, the system 100 fits a ZH model to each of M''s $n_b$ rows, just as it did for the diffuse transfer vector t. In other words, a diffuse transfer vector is just a single-row transfer matrix. The result is a quickly rotatable representation for glossy transfer that can be applied to deformable models. The final shade is given by evaluating each of the $n_b$ scalars using equation (13) for each row of M', and then dotting that result with the $n_b$-dimensional vector u(v), or $$r(v) = \sum_{j=1}^{n_b} u_j(v) \sum_{i=1}^{N} \sum_{lm} y_{lm}(s_{ji}^*) g_{jil}^* e_{lm} \qquad (16)$$

where j varies over M_rows. u(v) is a 32×32 texture, which composes a mapping from square to disk (such as described by Shirley, P., And Chiu, K., "A Low Distortion Map Between Disk And Square," *Journal of Graphics Tools* 2, 3, 45-52) with an area-preserving mapping from disk to hemisphere.

Rotating Transfer vs. Light In an alternative implementation of the system 100, another possible solution to the problem posed by deformable models is to fit a ZH model to the lighting e rather than the transfer vector t or matrix M'. Instead of rotating transfer into the deformed coordinate frame, this alternative implementation rotates lighting into the rest coordinate frame. The advantage is that a ZH fit is no longer needed over each point on the object or texture patch.

There are three reasons why applying the ZH model to transfer instead of lighting is generally the preferred implementation in many applications. First, lighting is typically a higher-frequency signal requiring more lobes than transfer for an accurate fit. More lobes incurs more run-time rendering cost. Transfer signals for diffuse or semi-glossy surfaces are smoother than lighting because they are modulated by a cosine and the object's BRDF, and because reflectance and visibility are limited in dynamic range. Colored lighting also requires a separate ZH model per color channel while transfer can often be approximated by a single channel modulated by a constant color. The term constant in this context means independent of the lighting direction s, not spatially constant.

The single-channel transfer approximation is exact for shadowing and accurate for other effects assuming spatial color variation is low.

Second, ZH fitting requires slow, non-linear optimization best done as a pre-process. But it must be done at every frame if the lighting is dynamic and at every point if it is local (spatially-varying).

Third, the preferred implementation admits a significant rendering speed-up described in Section on "Rendering" below. It depends on a precomputation over a fixed lighting environment shared by many points, and can not be similarly applied to transfer which varies spatially.

2.3 ZH Error Analysis

A constant (DC) signal (n=1) can be represented by a single coefficient. The illustrated system 100 therefore stores the DC coefficient explicitly, and fits ZH lobes to the remaining components, l>0. A linear SH function (n=2) can be exactly reproduced using any three linearly independent vectors as lobe directions. Therefore, when three or more lobes are used, the illustrated system 100 stores the linear components directly to reduce storage.

A linear SH function is also circularly symmetric about an axis, because the basis functions are linear polynomials in $s_x$, $s_y$, and $s_z$. That axis of symmetry for a linear SH vector $f$ is given by normalizing the 3D vector of its linear basis coefficients $(-f_{11}, -f_{1-1}, f_{10})$. We call this the optimal linear lobe for $f$. Higher order SH expansions however can not be represented exactly as a finite sum of rotated Legendre functions of the same order. Fortunately, error approaches 0 rapidly as N increases.

Figure 3A:
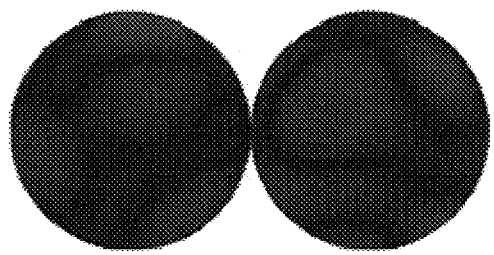
FIGS. 3A-D are color photographic images depicting an example of a randomly generated spherical signal, together with zonal harmonics approximations of the signal.
Figure 3B:
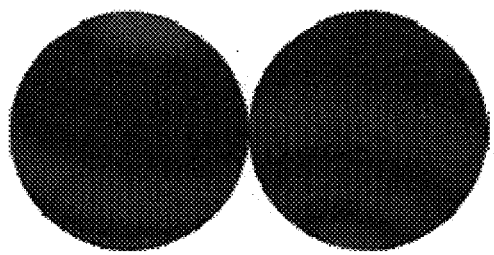
Figure 3C:
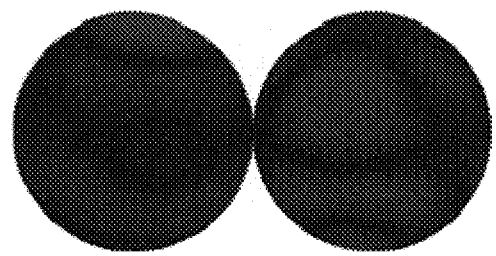
Figure 3D:
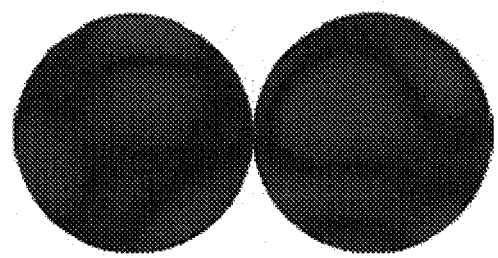
Figure 4A:
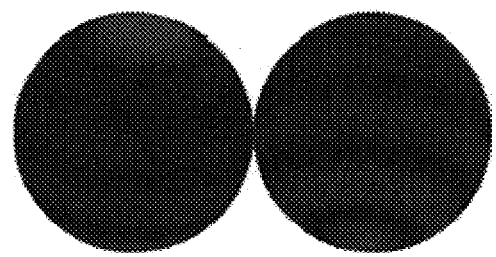
FIGS. 4A-D are color photographic images depicting example 4 lobe zonal harmonics basis functions used in the zonal harmonics approximations depicted in FIGS. 3B-D.
Figure 4B:
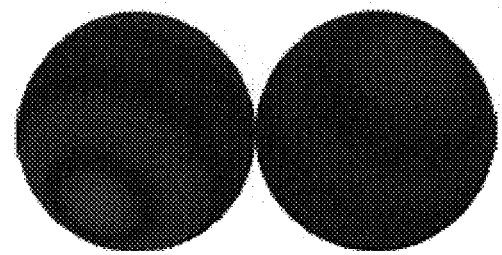
Figure 4C:
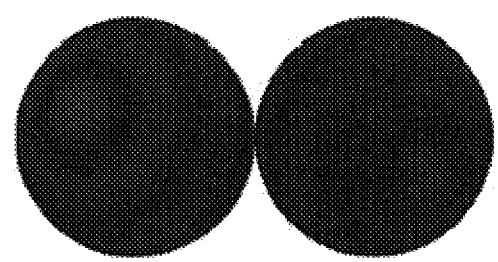
Figure 4D:
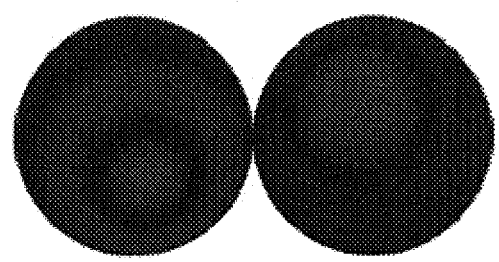

FIGS. 3B-D show ZH fit results for a difficult, randomly generated SH function depicted in FIG. 3A. The original signal was randomly generated as a unit-length SH vector (of n=6). In the graph images, positive values are colored red, and negative blue. The ZH approximations shown in FIGS. 3B-D use increasing numbers of lobes N, which are shown in FIGS. 4A-D. In particular, the ZH approximation shown in FIG. 3B approximates the original signal (FIG. 3A) with one lobe (N=1), resulting in RMS error equal to 0.751. The ZH approximations in FIGS. 3C and 3D use N=2 and N=4 lobes, respectively; and achieve substantial decreases in error (i.e., RMS=0.517 and RMS=0.116, respectively). An example with N=6 lobes (not shown) further decreases the RMS error to 0.00908, or less than 1% of the original signal's $L^2$ norm.

Figure 5A:
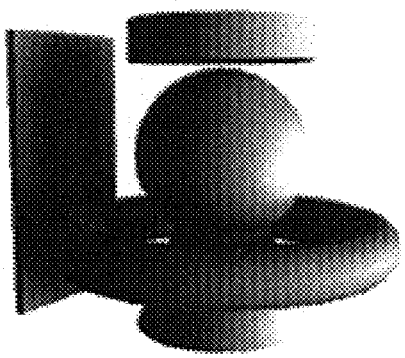
FIGS. 5A-E are color photographic images depicting the LDPRT technique applied to an example model of objects with a diffuse surface approximated at various numbers of ZH lobes.
Figure 5B:
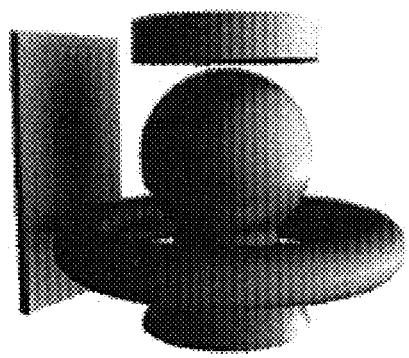
Figure 5C:
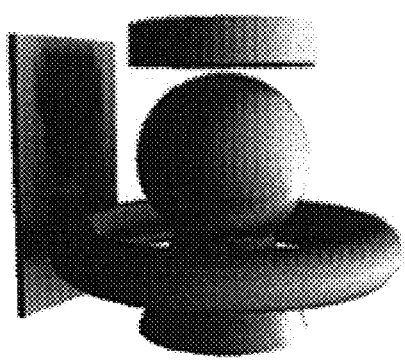
Figure 5D:
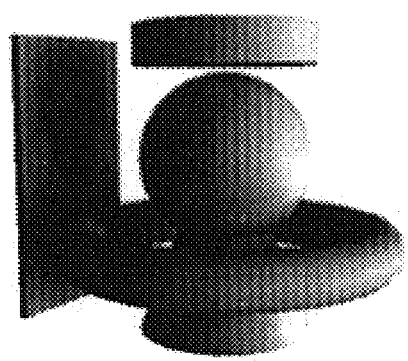
Figure 5E:
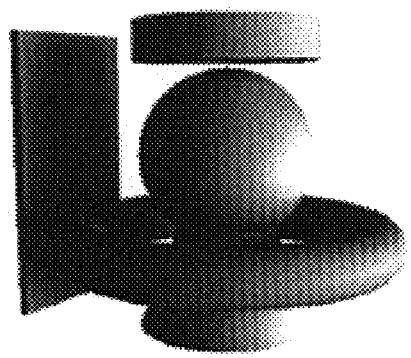

For the diffuse PRT (just described above), the ZH model fits even better as illustrated by the example shown in FIGS. 5A-E. This example uses sixth order SH lighting (n=6). For single-lobe models (N=1), using the optimal linear lobe (as shown in FIG. 5B) results in higher error (RMS=0.292 versus RMS=0.264) than fitting optimally to all 36 components of the transfer vector (as shown in FIG. 5C), as would be expected. The optimal linear approximation (FIG. 5B) is spatially smoother, though. The LDPRT example in FIG. 5C uses a two-lobe ZH approximation, which lowers the error to RMS=0.123. A four lobe approximation (FIG. 5E) matches the original signal well, both visually and in terms of error measurement (RMS=0.016).

Figure 6A:
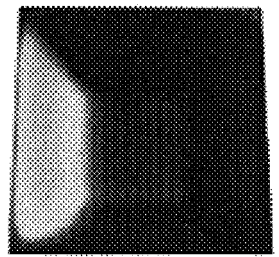
FIGS. 6A-D are color photographic images depicting an example glossy model approximated using the LDPRT technique.
Figure 6B:
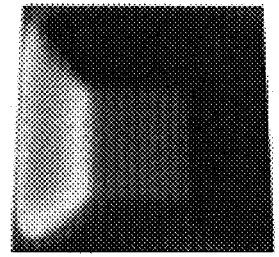
Figure 6C:
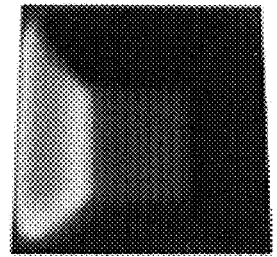
Figure 6D:

FIGS. 6A-D shows a glossy model shaded with fourth-order lighting (n=4), using the technique described by Cook, R., And Torrance, K., "A reflectance model for computer graphics," *ACM Trans. Gr.* 1, 1, 7-24 with glossiness=0.3. A singular value decomposition (SVD) and BRDF-specialized transfer (as shown in FIG. 6B) provides a good approximation with only $n_b$=3 rows instead of $n^2$=16 in the original model. A glossy LDPRT using a ZH approximation with N=3 lobes per row is shown in FIG. 6C, which then provides an accurate fit with $n_b$N=9 total lobes. FIG. 6D shows the glossy LDPRT of FIG. 6C mapped over the surface of a "vase" model.

2.4 SH Rotation

General SH rotation can be computed most efficiently by converting to zyz Euler angles. This is because rotation around the z axis by an angle θ of a component band l has a special form that can be performed by l–1 2D rotations of the ±m, |m|>0 components by an angle mθ. Rotation around z is therefore $O(n^2)$.

Unfortunately, the required y rotation is more difficult. A simple method to rotate around y by an angle φ is to further decompose it into a series of three rotations: a rotation of +90° around x, followed by a z rotation by φ, followed by a rotation of –90° around x. These two x rotations are inverses and thus transposes because they are themselves high-dimensional rotation matrices. It also turns out that these x rotations are sparse: asymptotically only 25% of the (2l+1)×(2l+1) rotation matrix components are nonzero as l→∞. Exploiting this sparsity reduces computation, but it is only a constant factor reduction, so x rotation remains $O(n^3)$. Note that the sparsity of ±90° rotation around x means that the method asymptotically requires a number of multiplies equal to 50% of the number of components in the SH rotation matrix, and thus compares favorably to methods for instantiating that matrix through recursive rules, such as that described by Choi, C., Ivanic, J., Gordon, M., And Ruedenberg, K., "Rapid And Stable Determination Of Rotation Matrices Between Spherical Harmonics By Direct Recursion," *The Journal of Chemical Physics* 111, 19 (November), 8825-8831.

We include a table of total multiplication counts for rotating various SH orders using the zxzxz method:

| n = 3 | n = 4 | n = 5 | n = 6 | n = 7 | n = 8 | n = 9 |
|-------|-------|-------|-------|-------|-------|-------|
| 53    | 121   | 217   | 345   | 509   | 713   | 961   |

The table assumes the linear band l=1 is rotated using the more efficient method of a 3×3 rotation matrix. The constant band l=0 is not changed by rotation. Conversion of a rotation matrix to Euler angles is not included here, but requires 5 multiplies, a reciprocal, and a square root.

SH rotation is very costly for the sixth order lighting (n=6) we use and rapidly gets worse at higher order. Three such rotations must be computed for colored lighting, amounting to more than a thousand multiplies. This should be compared to N≦4 3×3 rotations of a lobe axis from equation (10) for diffuse transfer.

3. Creating ZH Transfer Modes

3.1 Tabulated Models

Using nonlinear optimization, the ZH model may be fit to an arbitrary spherical functions expressed in the SH basis. The objective function ψ to be minimized is simply the $L^2$ norm of the vector difference of the ZH approximation $\tilde{t}$ from equation (11) with the original transfer vector t being approximated, or $$\Psi = \|\tilde{t} - t\|^2 = \int_{S^2} (\tilde{t}(s) - t(s))^2 \, ds \tag{17}$$

By the orthogonality of the SH basis, this vector distance equals the squared difference between the continuous functions $\tilde{t}(s)$ and $t(s)$ integrated over the sphere.

Note that the ZH transfer model must be fit over many points on an object or in a patch of local texture, so that this optimization is applied many times. Fitting glossy PRT is similar, except that it is done for each row in M' from equation (15).

Single-Lobe Fitting For a single-lobe ZH model, if the lobe axis s* is fixed, then the lobe coefficients that best approximate a given SH vector t are given in closed form as $$g_l^* = \frac{\sum_{m=-l}^{+l} y_{lm}(s^*) t_{lm}}{\sum_{m=-l}^{+l} y_{lm}^2(s^*)} \quad (18)$$

This formula simply computes the least-squares best match of the single lobe coefficient $g_l^*$ to the 2l+1 components of the basis function evaluation $y(s^*)$ in each band l. The denominator above is a constant, $\Sigma_m y_{lm}^2(s) = (2l+1)/(4\pi)$, so the LDPRT technique in the illustrated system 100 (FIG. 1) precomputes a table of reciprocals of this sum of squares for each band index l.

The illustrated implementation of the system 100 fits a single-lobe model to a given SH vector t by looping over a set of directions formed by uniformly sampling a hemi-cube. A hemi-cube suffices because opposite directions produce the same ZH model (see, Section, "ZH Representation for Spherical Functions" above). The system 100 also adds the optimal direction for just the linear part of the vector (see, Section, "ZH Error Analysis" above). For each direction used as a lobe axis, the system 100 computes the lobe coefficients using equation (18). The system 100 then runs BFGS minimization (such as described by Press, W., Teukolsky, S., Vetterling, W., And Flannery, B., "*Numerical Recipes in C, Second Edition*," Cambridge University Press, Cambridge, England) using this result as a starting point and both the lobe axis and lobe coefficients as minimization variables. The optimized direction yielding the smallest error (as shown in equation (17)) is the final result.

Optimization Notes Since BFGS is a derivative-based method, the illustrated implementation of the system 100 includes the derivatives of the objective function (17) with respect to the minimization variables:

$$\frac{\partial \Psi}{\partial g_l^*} = 2 \sum_m y_{lm}(s^*)(\tilde{t}_{lm} - t_{lm}) \quad (19)$$

$$\frac{\partial \Psi}{\partial s^*} = 2 \sum_{lm} \nabla y_{lm}(s^*) g_l^* (\tilde{t}_{lm} - t_{lm}) \quad (20)$$

The gradients of the SH basis functions $y_{lm}$ with respect to the spherical point s* were computed using Maple but can also be derived using the recurrence relations for SH evaluation.

To constrain 3D points s* to lie on the sphere, we substitute $h(s^*) = s^*/\|s^*\|$ for s* in the above equations. The gradient of $y_{lm} \cdot h$ replaces the gradient of $y_{lm}$ in (20), given by $$\nabla' y_{lm} = J_h \nabla y_{lm} \quad (21)$$

where $J_h$ is the 3×3 Jacobian of the normalization of function h.

Multi-Lobe Fitting To fit a multi-lobe model, the illustrated implementation of system 100 iteratively applies the above algorithm. The system 100 fits a single lobe, subtracts its reconstruction (equation 11) from the vector being approximated, and then fits the next lobe to the residual, up to N lobes. A local minimum can then be reached by applying the BFGS algorithm to all lobe parameters simultaneously. To speed things up, the system 100 first freezes lobe directions and optimizes only the lobe coefficients to get closer to a local minimum before applying BFGS over all lobe parameters.

Not surprisingly, additional searching often finds a better minimum. The system 100 applies further computation when the fit error is high, by trying randomly-generated sets of N lobe directions and then locally optimizing with BFGS.

3.2 Parametric Models

Translucent Thin-Membrane Model A simple model for diffuse translucency is shown in FIG. 1. It uses a cosine weighting function centered around the outward-pointing surface normal direction and an attenuated cosine weighting in the opposite direction, given by the spherical function $$g(s\zeta) = \begin{cases} s\zeta, & \text{if } s\zeta \geq 0 \\ -\alpha s\zeta, & \text{otherwise} \end{cases} \quad (22)$$

where $\alpha \leq 1$ is the transparency, and $s\zeta = s \cdot \zeta$ is the cosine of the angle s makes with the surface normal $\zeta$.

Since this is a circularly symmetric function around $\zeta$, it can be represented using a single-lobe ZH, where the lobe axis is the surface normal $\zeta$ and the lobe coefficients are given by $$g_l^* = \begin{cases} 2/3(1-\alpha), & \text{if } l = 1 \\ 2(1+\alpha)\left(\frac{(-1)^{l/2-1}}{(l+2)(l-1)}\right)\left(\frac{l!}{2^l((l/2)!)^2}\right), & \text{if } l \text{ even} \\ 0, & \text{otherwise} \end{cases} \quad (23)$$

This is the sum of two cosine-weighting functions, given by equation (8) in Ramamoorthi, R., And Hanrahan, P., "An Efficient Representation For Irradiance Environment Maps," *Proc. of SIGGRAPH* '01, 497-500. One just represents the response of a diffuse surface to low-frequency lighting. The other is scaled by transparency and oriented opposite to the normal direction to account for translucency. These coefficients are also divided by π to convert irradiance to exit radiance.

A spatially-varying translucency map (α) can be applied to enhance realism, as in the bat example. We also note that a subsurface scattering simulation can be performed to parameterize a more sophisticated model based on membrane thickness and scattering properties rather than simple transparency.

Wrinkle Model For example, the system 100 can model a wrinkle as a simple sinusoidal groove, parameterized by location along the groove cross-section, x, and groove depth d. The system 100 extrudes this groove and performs a diffuse PRT simulation on the resulting parameterized height field. The system 100 then fits a 3-lobe ZH model to its diffuse transfer signal. This fit uses bilinear basis functions which produce parameters for 3 lobes (axis and coefficients) as a 32×32 map of (x,d). DC and linear SH coefficients are explicitly stored, and fit with bilinear basis functions.

In performing the ZH fit, it is important to establish a correspondence between lobes. Independently fitting a ZH model to each (x,d) point does not match lobes at neighboring (x,d) and so causes artifacts when they are interpolated. The system 100 can instead perform a single optimization over the entire (x,d) space. Using bilinear basis functions in (x,d) for each lobe parameter and fitting to a more highly sampled version of the PRT signal automatically penalizes lack of correspondence between lobes. An initial guess for the optimizer is computed by a linear least squares fit of an optimal linear lobe (see, Section entitled, "ZH Error Analysis" above) with two additional lobes placed symmetrically around it, by a locally optimized angle. The final optimization then uses the conjugate gradient method described by Press, W., Teukolsky, S., Vetterling, W., And Flannery, B., "*Numerical Recipes in C, Second Edition*," Cambridge University Press, Cambridge, England.

4. LDPRT Rendering

Figure 7:
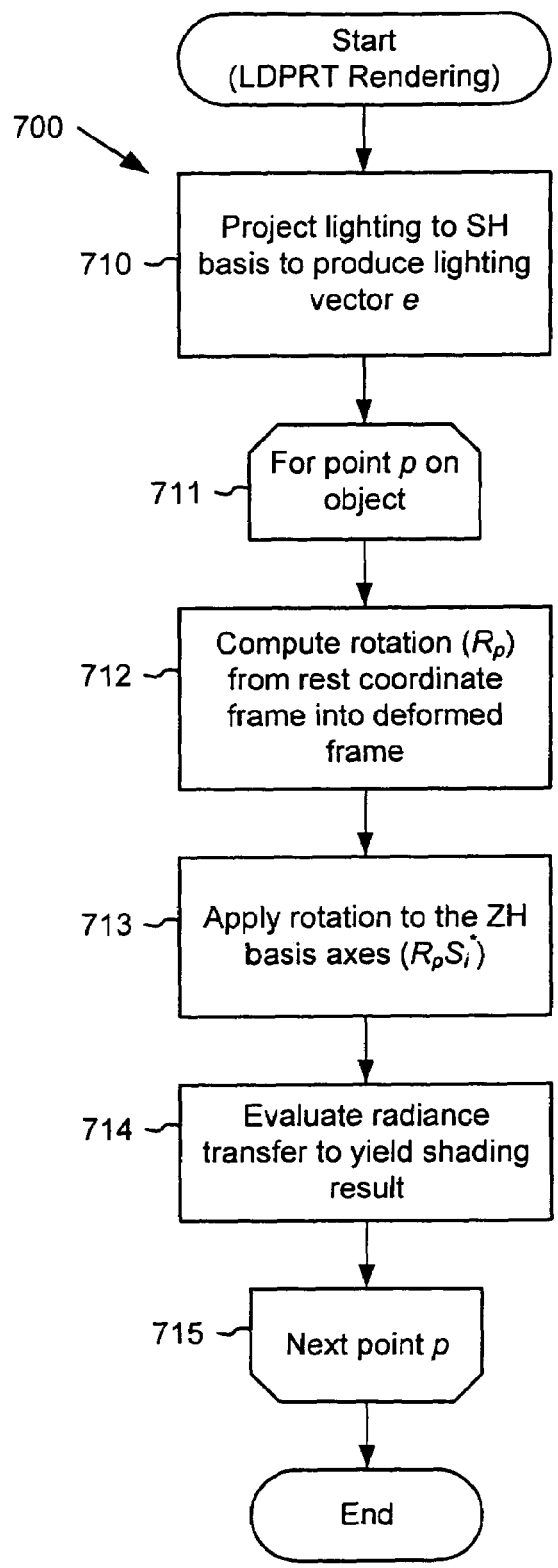
FIG. 7 is a flow diagram illustrating a process performed in the system of FIG. 1 for rendering an image using LDPRT.

FIG. 7 depicts a process 700 performed by the computer rendering system 100 (FIG. 1) for rendering an image using the LDPRT technique. This image rendering using LDPRT begins by projecting the lighting of the modeled lighting environment into the SH basis to produce the lighting vector e, as shown as action 710. Then, for a plurality of points p on the deforming object (e.g., for each vertex, or other distribution of points over a surface of the object) as indicated in loop 711-715, the rendering process 700 does the following:

1. computes the rotation $R_p$ from the rest coordinate frame into deformed frame (action 712),
2. applies $R_p$ to the N ZH axes ($n_b$N axes for glossy) at p:$R_p s_i^*$ (action 713),
3. evaluates equation (13) (equation (16) for glossy) for the shading result or exit radiance (action 714).

The local deformed frame $R_p$ can be computed on the CPU or in a vertex shader and is then interpolated using rasterization hardware. For example, the images of the example bat model (FIGS. 2A-B) were computed using skinning. The third step is done in a pixel shader.

Evaluating equation (13) can be sped up by storing the SH basis functions y(s) in spherical tables. This is useful when we wish to apply local lighting, which varies over points on the object. For distant lighting shared over many surface points, there's an even better speed-up described below.

Lighting-Specialized LDPRT To accelerate shading in equation (13), we can specialize ZH transfer evaluation to a particular lighting environment, e. A spherical table is created, ê(s) from points s∈$S^2$ into $R_n$, where n is the SH order, via $$\hat{e}_l(s) = \sum_{m=-l}^{+l} y_{lm}(s) e_{lm} \quad (24)$$

Now equation (13) simplifies to the following simple computation $$r = \sum_{i=1}^{N} \hat{e}(s_i^*) \cdot g_i^* = \sum_{i=1}^{N} \sum_{l=0}^{n-1} \hat{e}_l(s_i^*) g_{il}^* \quad (25)$$

requiring just N look-ups of ê at the lobe axes $s_i^*$ and N n-dimensional dot products between this result and the lobe coefficients $g_i^*$. Computation in (13) is reduced from O($n^2$N) to O(nN). Tabulated vectors are reduced from $n^2$-dimensional (y(s)) to n-dimensional (ê(s)). For small N, the computation is even simpler than the $n^2$-dimensional dot products required by the SH basis. The reduction is easily derived from (13) by grouping the $e_{lm}$ and $y_{lm}(s_i^*)$ factors and performing the inner sum over m to generate $\hat{e}_l$. We use a 64×32 map for ê(s), parameterized by latitude/longitude.

5. Results

FIGS. 8A-14E illustrate various shading effects achieved by rendering using the LDPRT rendering process 700 (FIG. 7). For the "unshadowed" results (shown in FIGS. 8A, 9A, 10A, 11A, and 12A), the shading on the object's surface simply integrates over a lighting hemisphere, but without blocking or scattering the source radiance. They are equivalent to rendering with spatially-varying normals which index an irradiance map, as described by Ramamoorthi, R., And Hanrahan, P., "An Efficient Representation For Irradiance Environment Maps," *Proc. of SIGGRAPH '01*, 497-500.

Figure 8A:
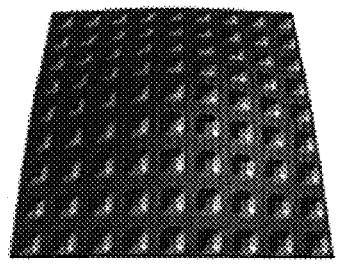
FIGS. 8A-B are color photographic images of an exemplary deformed 3d modeled object surface (bumps), comparing results achieved (A) unshadowed; and (B) shadowed via LDPRT.
Figure 8B:
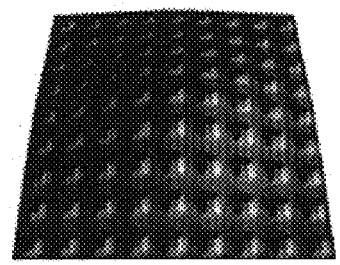
Figure 9A:
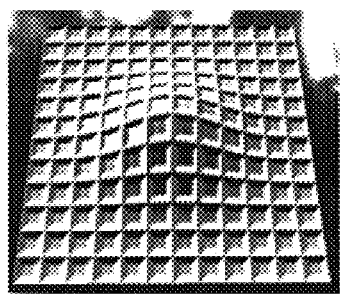
FIGS. 9A-C are color photographic images of an exemplary deformed 3d modeled object surface (waffle), comparing results achieved (A) unshadowed; (B) shadowed via LDPRT; and (C) subsurface.
Figure 9B:
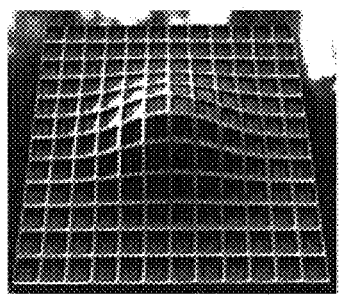
Figure 9C:
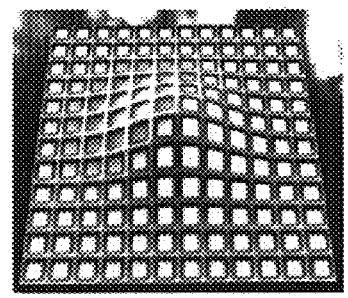

On the other hand, by including transfer effects in the precomputed simulation, the LDPRT rendering process 700 can incorporate shadowing for both diffuse (FIGS. 8B, 9B, 10B, 11B, 12B, 14A, 14B and 14E) and glossy surfaces (FIG. 14D), diffuse inter-reflection (FIG. 13C), and subsurface scattering (FIGS. 2A-B, 9C and 14C). The subsurface waffle texture (FIGS. 9C and 14C) simulates geometry whose thin bottom layer transmits more light than its sides. It was derived from an actual scattering simulation, and not the simple model described above in Section 3.2, entitle "Parametric Models." FIG. 8A shows the sharpest shadow we can cast with sixth-order SH lighting. All textures can be mapped onto any surface, no matter how it deforms.

The illustrated LDPRT implementation doesn't include distant effects like shadowing of the bat's wings onto its body (e.g., in FIGS. 2A-B), or effects from multiple occluding translucent layers (e.g., with the subsurface effects illustrated in FIG. 14C). The high-frequency local geometry is rendered properly in the front-most layer, masking these errors and maintaining a realistic appearance.

Two methods generate LDPRT from geometry: simulating a local texture patch which can be mapped onto various objects (as shown in FIGS. 14A-E), or PRT simulation on an entire mesh which can then be deformed. FIGS. 13A-C shows results from the latter method on a Mayan head. The mesh has been bent and twisted; the figure compares ray tracing the deformed model (in FIG. 13A), applying the undeformed PRT shading (in FIG. 13B), and applying LDPRT (in FIG. 13C). The results of the LDPRT rendering matches better by allowing the local coordinate frame to be rotated.

Local patch geometry is specified by a mesh (for the waffle in FIGS. 9A-C, and bumps in FIGS. 8A-B) or by inferring height fields from images (for the weave in FIG. 14B, and swirl in FIG. 14E). The height field can be inferred using the simple technique of mapping albedo to height. In the example images shown here, all LDPRT textures are diffuse except FIG. 14D. For diffuse textures in the example images, the parameters n=6 and N=4 were used, with the exception of the bat (FIG. 2A-B) where n=3 and N=1. For example image of the glossy texture (FIG. 14D), the parameters n=4, N=3, and nb=3 were used for 9 total lobes. For the LDPRT textures in these examples where N>1, the DC and linear SH coefficients are stored directly and can be bilinearly interpolated; the ZH lobes are fit to the remaining, higher-order SH coefficients and are point sampled.

Figure 10A:
FIGS. 10A-B are color photographic images of an exemplary deformed 3d modeled object surface (wrinkles), comparing results achieved (A) unshadowed; and (B) shadowed via LDPRT.
Figure 10B:
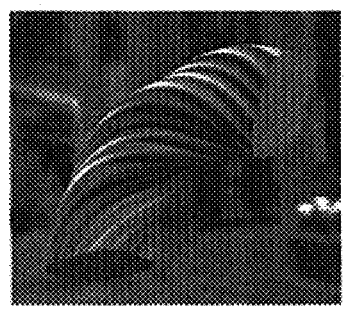
Figure 11A:
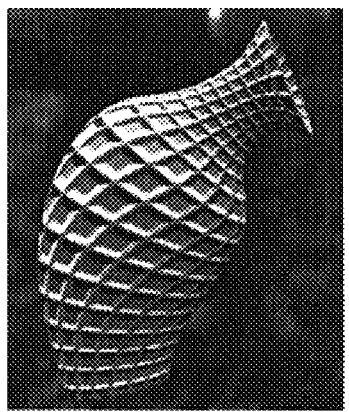
FIGS. 11A-B are color photographic images of an exemplary deformed 3d modeled object (vase), comparing results achieved (A) unshadowed; and (B) shadowed via LDPRT.
Figure 11B:
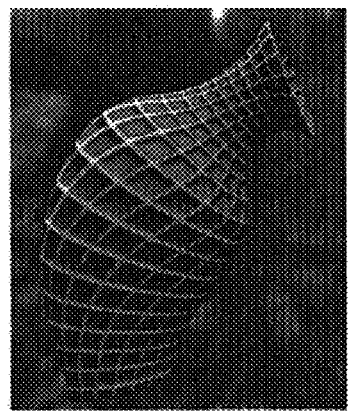
Figure 12A:
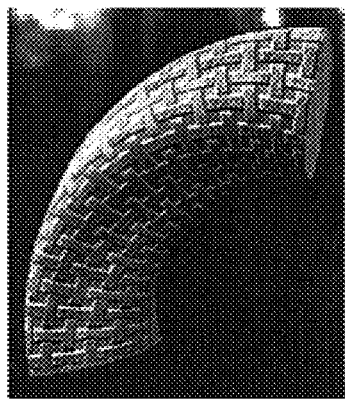
FIGS. 12A-C are color photographic images of an exemplary deformed 3d modeled object (cylinder), comparing results achieved (A) unshadowed; (B) shadowed via LDPRT; and (C) inter-reflected.
Figure 12B:
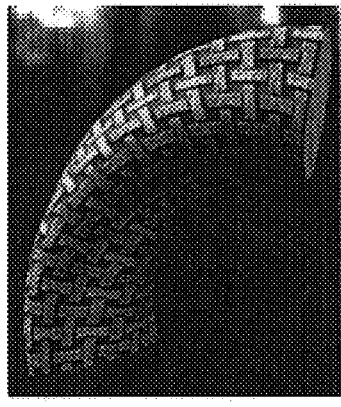
Figure 12C:
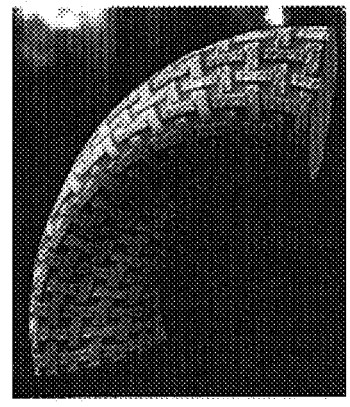

Examples of the above-discussed parametric models are shown in FIGS. 2A-B (translucent thin membrane model) and in FIGS. 10A-B (wrinkle model). For the example wrinkle model in FIGS. 10A-B, the groove location is made a function of angle around a smooth cylinder, which is then deformed.

Preprocessing (i.e., pre-computing the LDPRT) for these example images was dominated by the ZH fit. The most expensive fits were less than 30 minutes: namely, the Mayan head with 17575 vertices in FIG. 13C, the subsurface waffle (64×64) in FIG. 14C and the swirl (128×128) in FIG. 14E. The preprocessing time depends on the size of the texture (or number of mesh vertices), the number of lobes, and the complexity of the PRT signal. Smaller textures (e.g., the weave in FIG. 14B) take just a few minutes. The PRT simulations took from 4-10 minutes with 5000 rays per point. All examples were simulated and rendered with single-channel transfer. These timings were achieved on a computer equipped with a 3.0 Ghz P4 processor and a Geforce 6800 Ultra graphics card.

We recorded run-time rendering rates of between 100-200 Hz for the diffuse examples (3-channel lighting) and 70-100 Hz for the glossy example (1-channel lighting). This includes the time to build the light specialized map each frame (1430 Hz by itself).

6. Computing Environment

The above described graphics image rendering system 100 (FIG. 1) that implements the local, deformable precomputed radiance transfer image rendering techniques can be implemented on any of a variety of computing devices and environments, including computers of various form factors (personal, workstation, server, handheld, laptop, tablet, or other mobile), distributed computing networks, and Web services, as a few general examples. The image rendering techniques can be implemented in hardware circuitry, as well as in software 1580 executing within a computer or other computing environment, such as shown in FIG. 15.

Figure 15:
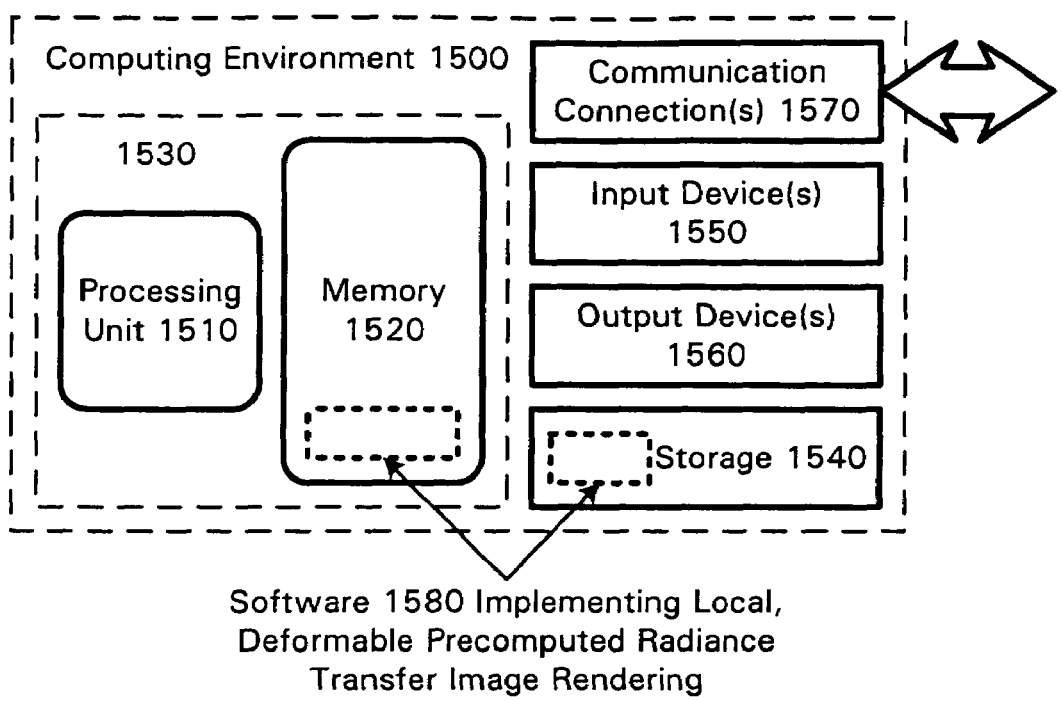
FIG. 15 is a block diagram of a suitable computing environment for implementing the bi-scale radiance transfer image rendering of FIG. 1.

FIG. 15 illustrates a generalized example of a suitable computing environment 1500 in which the described techniques can be implemented. The computing environment 1500 is not intended to suggest any limitation as to scope of use or functionality of the invention, as the present invention may be implemented in diverse general-purpose or special-purpose computing environments.

With reference to FIG. 15, the computing environment 1500 includes at least one processing unit 1510 and memory 1520. In FIG. 15, this most basic configuration 1530 is included within a dashed line. The processing unit 1510 executes computer-executable instructions and may be a real or a virtual processor. In a multi-processing system, multiple processing units execute computer-executable instructions to increase processing power. The memory 1520 may be volatile memory (e.g., registers, cache, RAM), non-volatile memory (e.g., ROM, EEPROM, flash memory, etc.), or some combination of the two. The memory 1520 stores software 1580 implementing the computer graphics image rendering system 100 with local, deformable precomputed radiance transfer.

A computing environment may have additional features. For example, the computing environment 1500 includes storage 1540, one or more input devices 1550, one or more output devices 1560, and one or more communication connections 1570. An interconnection mechanism (not shown) such as a bus, controller, or network interconnects the components of the computing environment 1500. Typically, operating system software (not shown) provides an operating environment for other software executing in the computing environment 1500, and coordinates activities of the components of the computing environment 1500.

The storage 1540 may be removable or non-removable, and includes magnetic disks, magnetic tapes or cassettes, CD-ROMs, CD-RWs, DVDs, or any other medium which can be used to store information and which can be accessed within the computing environment 1500. The storage 1540 stores instructions for the software 1580 of the computer graphics image rendering system implementing the local, deformable precomputed radiance transfer techniques.

The input device(s) 1550 (e.g., for devices operating as a control point in the device connectivity architecture 100) may be a touch input device such as a keyboard, mouse, pen, or trackball, a voice input device, a scanning device, or another device that provides input to the computing environment 1500. For audio, the input device(s) 1550 may be a sound card or similar device that accepts audio input in analog or digital form, or a CD-ROM reader that provides audio samples to the computing environment. The output device(s) 1560 may be a display, printer, speaker, CD-writer, or another device that provides output from the computing environment 1500.

The communication connection(s) 1570 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The local, deformable precomputed radiance transfer image rendering techniques herein can be described in the general context of computer-readable media. Computer-readable media are any available media that can be accessed within a computing environment. By way of example, and not limitation, with the computing environment 1500, computer-readable media include memory 1520, storage 1540, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of rendering a graphics image using a computer having a processor, memory and display, the method comprising:

calculating, by the processor, data of radiance transfer for a plurality of points over a surface of a modeled object for a rest coordinate frame, where the radiance transfer data for low frequency lighting is represented as a function of at least a sum of one or more products of coefficients and circularly symmetric basis functions, where the circularly symmetric basis functions have plural separate lobe axes and wherein the circularly symmetric basis functions are zonal harmonics;

based on the radiance transfer data, evaluating, by the processor, radiance transfer over at least a portion of the surface of the modeled object from a lighting environment for a view direction; and producing an image of the modeled object as lit according to the radiance transfer evaluation on the display.

2. The method of claim 1 wherein the calculating radiance transfer data is performed as a precomputation for the points sampled over a surface of the modeled object.

3. The method of claim 1 wherein the calculating radiance transfer data is calculated from a parameterized model of the radiance transfer over the surface of the modeled object, wherein the parameterized model defines the radiance transfer at the points over the surface of the modeled object as a function of at least one parameter varying according to location of the points over the surface of the modeled object, in combination with the function of at least the sum of one or more products of coefficients and circularly symmetric basis functions.

4. The method of claim 1 wherein the calculating data of radiance transfer comprises:

calculating a radiance transfer vector at a sampled point; and approximating the vector using zonal harmonics.

5. The method of claim 4 wherein the approximating the radiance transfer vector comprises, iteratively performing the following up to a desired number of zonal harmonics lobes:

fitting a zonal harmonics lobe to a residual of the radiance transfer vector, the residual initially being the spherical harmonics vector; and subtracting the fitted zonal harmonics lobe from the current residual to produce a residual for a next iteration.

6. The method of claim 1 wherein the modeled object is deformable, the method further comprising:

deforming the modeled object, thereby causing orientations of at least some of the sampled points on the modeled object to change to respective deformed coordinate frames;

for a sampled point on the modeled object whose orientation has changed to a respective deformed coordinate frame, applying a rotation to the radiance transfer data of the sampled point from the rest coordinate frame to the respective deformed coordinate frame of the sampled point; and evaluating radiance transfer of the sampled point from a lighting environment for a view direction based on the rotated radiance transfer data of the sampled point.

7. The method of claim 6 wherein applying the rotation to the radiance transfer data comprises applying the rotation to axes of the circularly symmetric basis functions.

8. The method of claim 1 wherein the modeled object is deformable, the method further comprising:

deforming the modeled object, thereby causing orientations of at least some of the sampled points on the modeled object to change to respective deformed coordinate frames;

for a sampled point on the modeled object whose orientation has changed to a respective deformed coordinate frame, applying a rotation to the incident light from the lighting environment from the rest coordinate frame to the respective deformed coordinate frame of the sampled point; and evaluating radiance transfer of the sampled point from the rotated incident light of the lighting environment for a view direction based on the radiance transfer data of the sampled point.

9. The method of claim 1 wherein the radiance transfer data represents shadowing and light scattering of local surface features of the modeled object at the sampled point.

10. The method of claim 9 wherein the radiance transfer data further represents translucence of the modeled object at the sampled point.

11. At least one data carrying storage medium having encoded thereon a software program executable on an image rendering system for a method of rendering graphics images of a modeled object based on data of local, deformable precomputed radiance transfer for sampled locations over a surface of the modeled object, the method comprising:

for a plurality of locations on the modeled object:

computing a rotation from a rest coordinate frame of the precomputed radiance transfer data to a deformed frame for the respective location;

applying the rotation to the precomputed radiance transfer data of the respective location;

based on the rotated radiance transfer data of the respective location, evaluating radiance transfer from a lighting environment for a view direction to yield a shading result for the respective location; and producing an image of the modeled object with the locations on the modeled object shaded according to their respective shading result;

wherein the radiance transfer data for a respective location on a diffuse surface of the modeled object for low frequency lighting is a matrix $G_i^*$ of coefficients in a zonal harmonics representation having lobe axes $s_i^*$.

12. The computer-readable data carrying storage media of claim 11 wherein the evaluating comprises calculating the shading result according to the equation $$r = \sum_{i=1}^{N} y\dagger(s_i^*) G_i^* e,$$

where e is a lighting vector representing incident lighting from the lighting environment.

13. The computer-readable data carrying storage media of claim 11 wherein the radiance transfer data for a respective location on a glossy surface of the modeled object is a BRDF-specialized transfer matrix M' resulting from a singular value decomposition of coefficients in a zonal harmonics representation having lobe axes $s_i^*$ over a sampling of view and light directions, and the evaluating comprises calculating the shading result according to the equation, r(v)=u(v)M'e, where u(v) is a view factor vector and e is a lighting vector representing incident lighting from the lighting environment.

14. A graphics image processing system for rendering images of a deformable modeled object, comprising:

- a lighting simulator operating to perform a lighting simulation of the modeled object to produce a set of radiance transfer matrices for a set of sampled locations over a surface of the modeled object representing radiance response including local effects to incident low frequency lighting at the respective sampled locations, where the radiance transfer matrices contain a set of coefficients for a representation of the radiance response at the respective sampled location as a sum of products of the coefficients multiplied by circularly symmetric basis functions, where said circularly symmetric basis functions comprise functions on separate lobe axes and wherein the circularly symmetric basis functions are zonal harmonics;
- a run-time image rendering engine operating to determine lighting from a lighting environment for each of a plurality of viewed locations on the modeled object in an image as a function of incident lighting from the lighting environment, the set of radiance transfer matrices, and rotations for the viewed locations from a rest coordinate frame to a deformed frame on the modeled object in a deformed position; and
- a display driver operating to present the image of the modeled object in the lighting environment with the determined lighting on a display.

15. The graphics image processing system of claim 14 wherein the lighting simulator operates to produce the radiance transfer matrices by calculating a radiance transfer vector at a viewed location, and approximating the vector using zonal harmonics.

16. The graphics image processing system of claim 15 wherein the lighting simulator approximate the radiance transfer vector by iteratively performing the following up to a desired number of zonal harmonics lobes:

- fitting a zonal harmonics lobe to a residual of the radiance transfer vector, the residual initially being the spherical harmonics vector; and
- subtracting the fitted zonal harmonics lobe from the current residual to produce a residual for a next iteration.

17. The graphics image processing system of claim 14 wherein the run-time image rendering engine further operates to apply the rotations from the rest coordinate frame to the respective deformed coordinate frame for the viewed locations to the respective radiance transfer matrices of the viewed locations, and to determine lighting of the viewed locations by evaluating radiance transfer from the lighting environment for the view direction based on the respective rotated radiance transfer matrices of the viewed locations.

18. The graphics image processing system of claim 14 wherein the run-time image rendering engine further operates to apply the rotations from the rest coordinate frame to the respective deformed coordinate frame for the viewed locations to the incident light from the lighting environment, and to determine lighting of the viewed locations by evaluating radiance transfer from rotated incident light from the lighting environment based on the respective radiance transfer matrices of the viewed locations.

* * * * *

UNITED STATES PATENT AND TRADEMARK OFFICE
CERTIFICATE OF CORRECTION

PATENT NO. : 7,633,503 B2  Page 1 of 1
APPLICATION NO. : 11/089265
DATED : December 15, 2009
INVENTOR(S) : Snyder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 382 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 7,633,503 B2 | |
| APPLICATION NO. | : 11/089265 | |
| DATED | : December 15, 2009 | |
| INVENTOR(S) | : John M. Snyder et al. | |

It is certified that error appears in the above-identified patent and that said Letters Patent is hereby corrected as shown below:

In column 18, line 49, in Claim 12, delete "equation" and insert -- equation, --, therefor.

Signed and Sealed this
Tenth Day of May, 2011

David J. Kappos
*Director of the United States Patent and Trademark Office*